(12) United States Patent
Iwamoto et al.

(10) Patent No.: US 6,216,551 B1
(45) Date of Patent: Apr. 17, 2001

(54) TRANSFER LEVEL FOR 4-WHEEL DRIVE VEHICLE

(75) Inventors: Michitaka Iwamoto; Yasushi Arai, both of Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 09/162,793

(22) Filed: Sep. 29, 1998

(30) Foreign Application Priority Data

Sep. 30, 1997 (JP) .................................................. 9-282585

(51) Int. Cl.⁷ ...................................................... B60K 5/00
(52) U.S. Cl. ......................................................... 74/473.34
(58) Field of Search ........................... 74/473.33, 473.34; 180/247, 250

(56) References Cited

U.S. PATENT DOCUMENTS

| | | | |
|---|---|---|---|
| 5,144,853 | * | 9/1992 | Giudici ............................ 473/473.15 |
| 5,313,853 | * | 5/1994 | Olmsted et al. ................. 473/473.34 |

FOREIGN PATENT DOCUMENTS 08156625 6/1996 (JP) .

* cited by examiner

Primary Examiner—Kevin Hurley
Assistant Examiner—Andrew J. Fischer
(74) Attorney, Agent, or Firm—Morrison Law Firm

(57) ABSTRACT

An improved transfer lever for a 4WD vehicle is arranged such that the position of a knob attachment piece remains the same even when used with transmissions of two different lengths. The difference between the two lengths is a distance D. This retains the knob attachment piece in an optimal shift position can be attained. The transfer lever is bent, proximate its base, at an angle that places the knob attachment piece a distance D/2 from a centerline of its base. The transfer lever is installable in two orientations 180 degrees apart. When the longer transmission is used, the transfer lever is installed to position the knob attachment piece D/2 forward of the centerline, and when the shorter transmission is used, the transfer lever is installed to position the knob attachment piece D/2 rearward of the centerline, whereby the knob attachment piece is positioned in the same fore and aft location regardless of which transmission is used.

2 Claims, 6 Drawing Sheets

PRIOR ART

PRIOR ART

TRANSFER LEVEL FOR 4-WHEEL DRIVE VEHICLE

BACKGROUND OF THE INVENTION

The present invention relates to a transfer lever for a 4WD vehicle and, in particular, to an improved transfer lever adapted for use with transmissions of differing lengths.

Four wheel drive vehicles (4WD) include a transmission device in which the transfer is integrally attached to the transmission. The transfer includes a transfer lever which is operated to switch between 4 wheel drive and 2 wheel drive.

Referring to FIG. 7, a transmission device 102 of a 4WD automobile includes a transfer 106 attached at the rear of an automatic transmission (AT) 104-1. Because automatic transmission 104-1 includes parts such as torque converters or the like, it has a length A.

A transfer lever 108 in transfer 106 is operated to switch between 4 wheel drive and 2 wheel drive. Transfer lever 108 operates a 4-wheel 2-wheel switching mechanism (not shown). The distance between the attachment surface of transfer 106, where the rear surface of automatic transmission 104-1 is connected, and the center 110C of a lever attachment piece 110, where the base end of transfer lever 108 is attached, is identified as B. Furthermore, a knob attachment piece 112 at the tip of transfer lever 108 is positioned to the rear of center 110C.

Referring to FIG. 8, there is shown a prior-art transmission device 102 having a manual transmission (MT) 104-2. Transfer 106 is attached to manual transmission 104-2 in the same manner as with automatic transmission 104-1.

Manual transmission 104-2 does not require parts such as torque converters, or the like. As a result, it has a length C which is slightly less than length A of automatic transmission 104-1. This difference in length positions transfer lever 108 knob attachment piece 112 to the rear of center 110C.

An example of this transfer device for a 4WD automobile is disclosed in Japanese Laid Open Patent number 8-156625. In this publication, a transfer is connected to a transmission. In this transfer, there are 3 shift positions: a high speed gear on demand 4 wheel drive position, in which the safety of on road driving is improved; a high speed gear direct 4 wheel drive position, which is suited for continuous off road driving; and a low speed gear direct four wheel drive position, which is suited for situations where a large drive torque is necessary in off-road driving. With this transfer, it is possible to easily switch between the three shift positions with one switching rail which interlocks with the transfer lever. On-road safety and off-road driveability can coexist.

However, referring to FIG. 9, when attaching transfer 106, which has the same length B to each of automatic transmission 104-1, which has a longer length A, and manual transmission 104-2, which has a shorter length C, the position at which transfer lever 108 is located is changed. The change is by a measurable distance D between the location of center 110C of lever attachment 110 of automatic transmission 104-1 and center 110C of lever attachment 110 of manual transmission 104-2. Furthermore, the position of knob attachment piece 112 of transfer lever 108 also changes in the front to rear direction. As a result, the optimal shift position is not achieved in both manual and automatic transmissions. Furthermore, when there is a difference in the length of the transmission, one single transfer lever can not accommodate differing types of vehicles.

OBJECTS AND SUMMARY OF THE INVENTION

It is the object of the present invention is to solve the problems of the prior art as described above. The present invention is an improved transfer lever for a 4WD vehicle of the type including: a transmission; a transfer attached to the transmission; and a transfer lever operable to switch the transfer between 4 wheel drive and 2 wheel drive; the transfer lever is bent, proximate its base, to form an angle such that, when attached to transmissions of differing lengths, the attachment orientation of the transfer lever can be altered, according to the transmission length, so that the position of the knob attachment piece of the transfer lever remains unchanged.

Briefly stated, the present invention provides an improved transfer lever for a 4WD vehicle which is arranged such that the position of a knob attachment piece remains the same even when used with transmissions of two different lengths. The difference between the two lengths is a distance D. This retains the knob attachment piece in an optimal shift position can be attained. The transfer lever is bent, proximate its base, at an angle that places the knob attachment piece a distance D/2 from a centerline of its base. The transfer lever is installable in two orientations 180 degrees apart. When the longer transmission is used, the transfer lever is installed to position the knob attachment piece D/2 forward of the centerline, and when the shorter transmission is used, the transfer lever is installed to position the knob attachment piece D/2 rearward of the centerline, whereby the knob attachment piece is positioned in the same fore and aft location regardless of which transmission is used.

According to an embodiment of the invention, there is provided a transfer lever for attachment to a transmission of a 4WD vehicle, the transmission having one of first and second lengths, a difference between the first and second lengths being a distance D, the first length being greater than the second length, comprising: a transfer attached to the transmission, the transfer lever attached to the transfer, operable to switch the transfer between 4 wheel drive and 2 wheel drive, the transfer lever having a base at a first end for attachment to the transfer and a knob attachment piece at a second end for operation by an operator, a bend in the transfer lever proximate the base, the bend placing the knob attachment piece a distance D/2 from a centerline of the knob attachment piece, the transfer lever being attachable in first and second orientations, 180 rotational degrees apart, and the first orientation positioning the knob attachment piece the distance D/2 forward of the centerline when the transmission of the first length is used, and positioning the knob attachment piece the distance D/2 rearward of the centerline when the transmission of the second length is used, whereby the knob attachment piece is disposed in substantially the same fore and aft location, regardless of which length of transmission is employed.

According to a feature of the invention, there is provided a transmission of a 4WD vehicle, the transmission having one of first and second lengths, a difference between the first and second lengths being a distance D, the first length being greater than the second length, comprising: a transfer operably attached to the transmission, a transfer lever attached to the transfer, operable to switch the transfer between 4 wheel drive and 2 wheel drive, the transfer lever having a base at a first end for attachment to the transfer and a knob attachment piece at a second end for operation by an operator, a bend in the transfer lever proximate the base, the bend placing the knob attachment piece a distance D/2 from a centerline of the knob attachment piece, the transfer lever being attachable in first and second orientations, 180 rotational degrees apart, and the first orientation positioning the knob attachment piece the distance D/2 forward of the centerline when the transmission of the first length is used, and positioning the knob attachment piece the distance D/2 rearward of the centerline when the transmission of the second length is used, whereby the knob attachment piece is disposed in substantially the same fore and aft location, regardless of which length of transmission is employed.

The above, and other objects, features and advantages of the present invention will become apparent from the following description read in conjunction with the accompanying drawings, in which like reference numerals designate the same elements.

DETAILED DESCRIPTION OF THE REFERRED EMBODIMENT

According to the present invention, the attachment orientation of the transfer lever changes, depending on the length of the transmission. Even if the position where the base of the transfer lever is located changes, an optimal shift position is maintained without changing the transfer lever knob attachment piece. Furthermore, even if the length of the transmission is different, an optimal shift position can be attained with respect to different types of vehicles, while using a uniform transfer lever and without changing the knob attachment position of the transfer lever.

Figure 2:
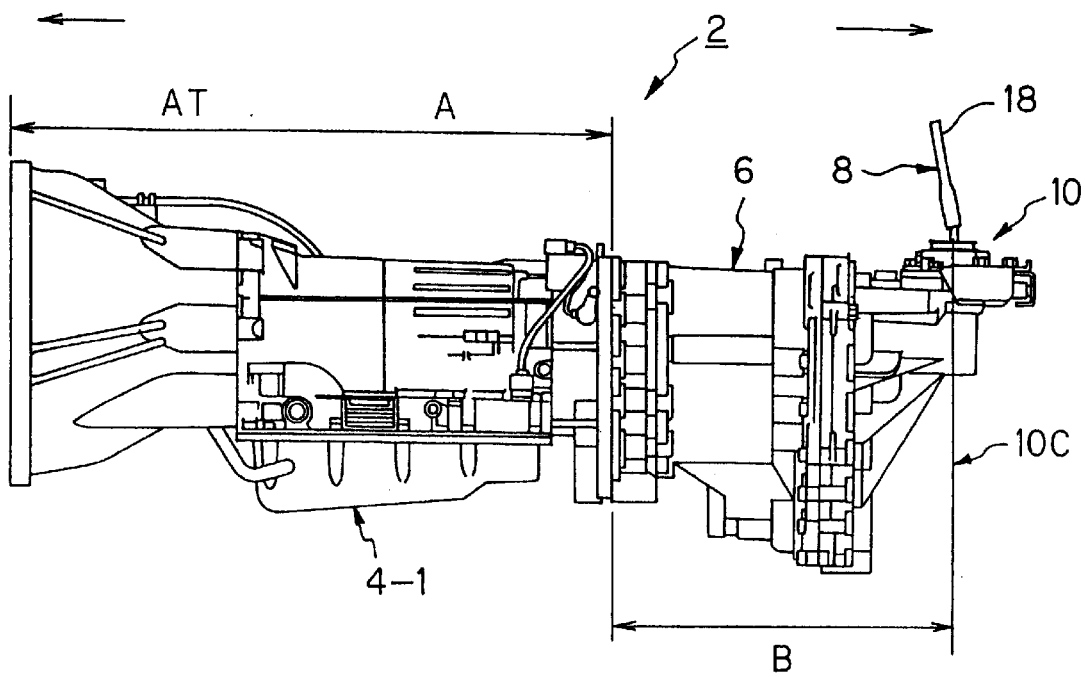
FIG. 2 is a side view of a transfer attached to an automatic transmission.

Referring to FIG. 2, there is shown a transmission device 2 for a 4WD automobile. Transmission device 2 has an automatic transmission (AT) 4-1 and a transfer 6 integrally attached to the rear of automatic transmission 4-1.

Because automatic transmission 4-1 includes parts such as torque converter, or the like, it has a length A.

Transfer 6 includes a transfer lever 8 which is operated in to switch between 4 wheel drive and 2 wheel drive. Transfer lever 8 operates a 4-wheel 2-wheel switching mechanism (not shown). In transfer 6, the distance between the attachment surface, where automatic transmission 4-1 is connected, and the center 10C of a lever attachment piece 10, where the base end of transfer lever 8 is attached is a length B.

Figure 4:
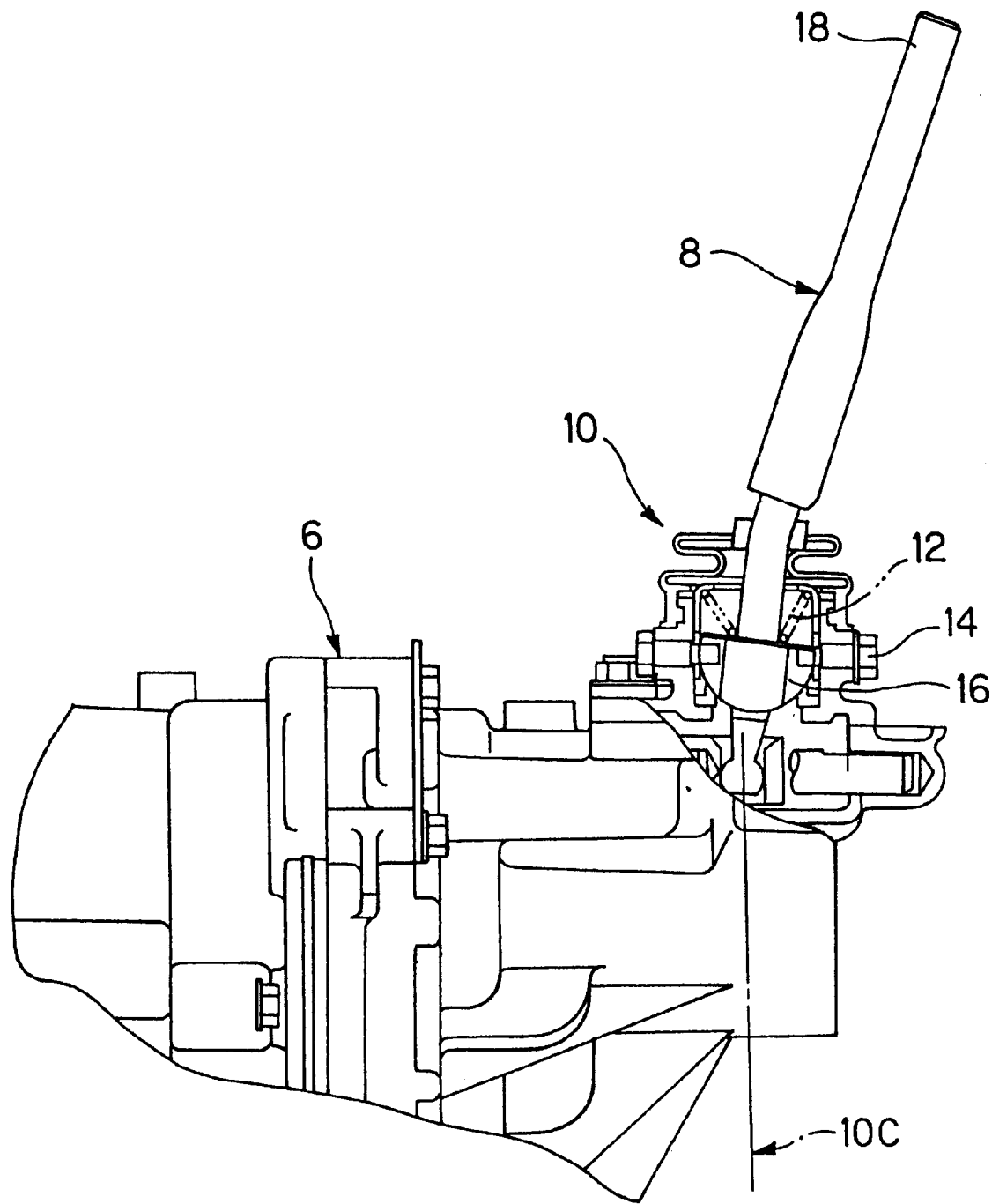
FIG. 4 is an enlarged cross-sectional view of a lever attachment piece in accord with the present invention.
Figure 5:
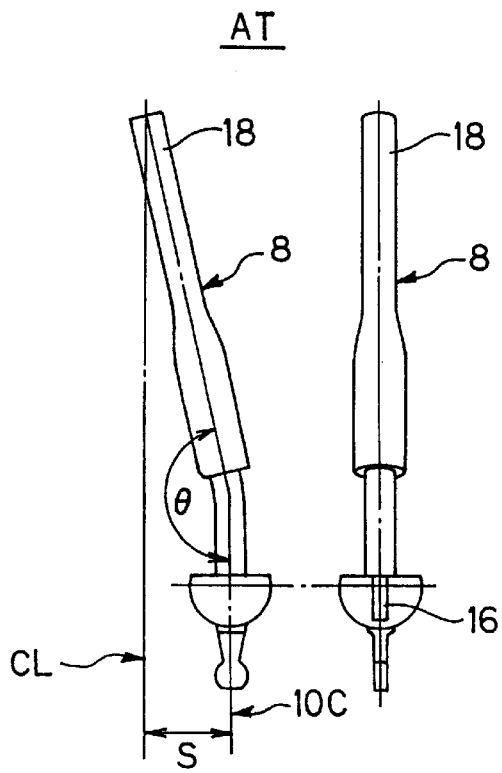
FIG. 5 is a pair of side views illustrating the attachment orientation of a transfer lever when a transfer is attached to an automatic transmission.

Referring to FIGS. 4 and 5, the base of transfer lever 8 is supported on lever attachment piece 10 by parts including a spring 12, a locking bolt 14, and a locking slit 16. Transfer lever 8 is bent, proximate its base, at an angle theta to position knob attachment piece 18 on a line CL which is spaced from a center line at of knob attachment piece 18 by a distance S. The angle theta is selected so that the distance S is half of the measurement difference D shown in FIG. 9.

When transfer 6 is attached to an automatic transmission 4-1, as shown in FIG. 5, knob attachment piece 18 is positioned the distance S to the front of center 10C of lever attachment piece 10.

Figure 3:
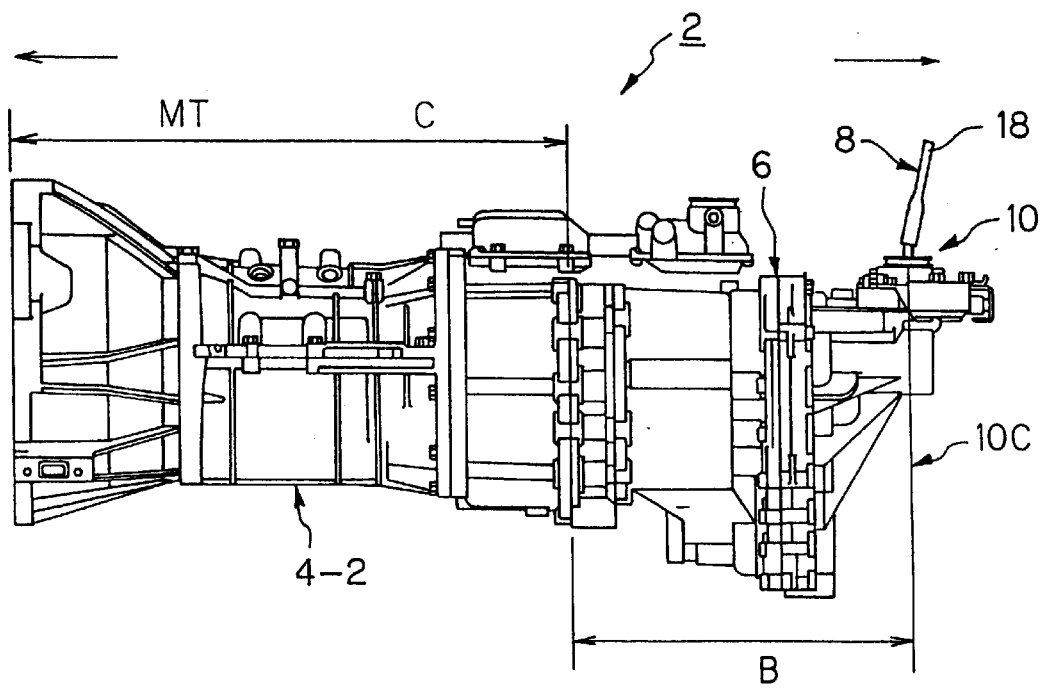
FIG. 3 is a side view of a transfer attached to a manual transmission.
Figure 6:
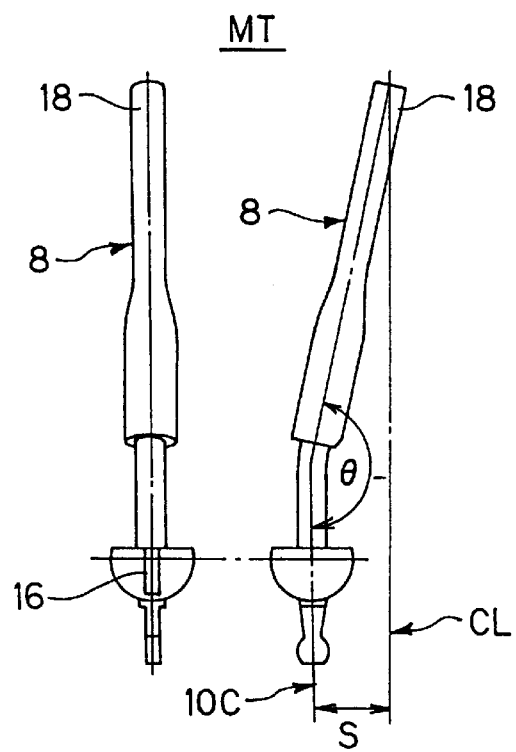
FIG. 6 is a pair of side views illustrating the attachment orientation of a transfer lever when a transfer is attached to a manual transmission.
Figure 7:
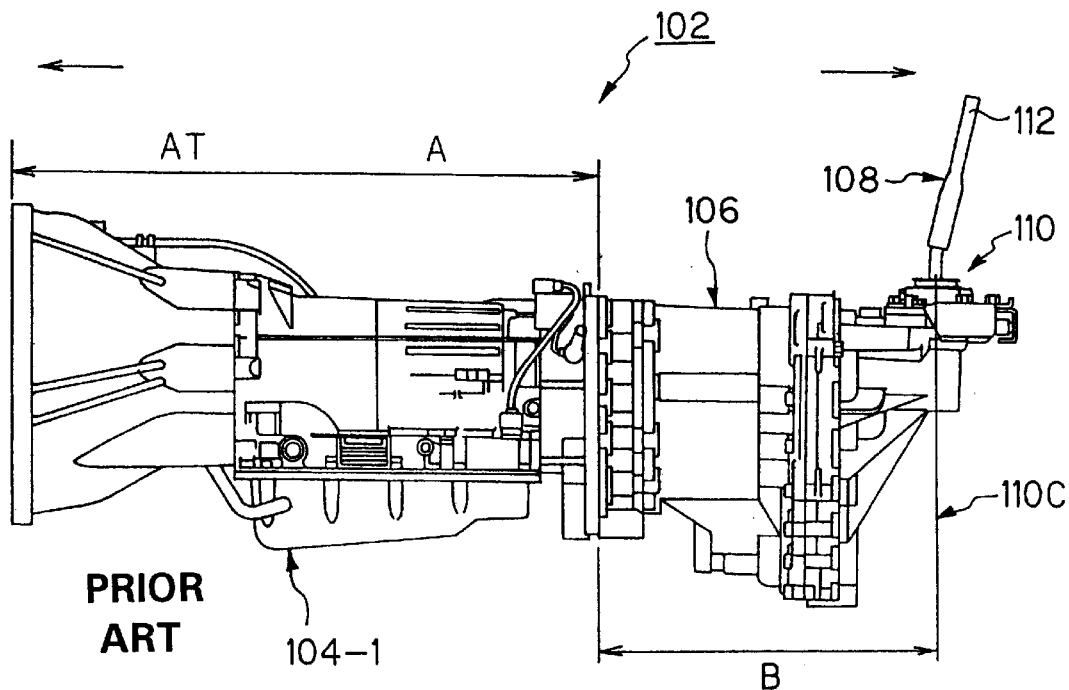
FIG. 7 is a side view of a transfer attached to an automatic transmission as in the prior art.
Figure 8:
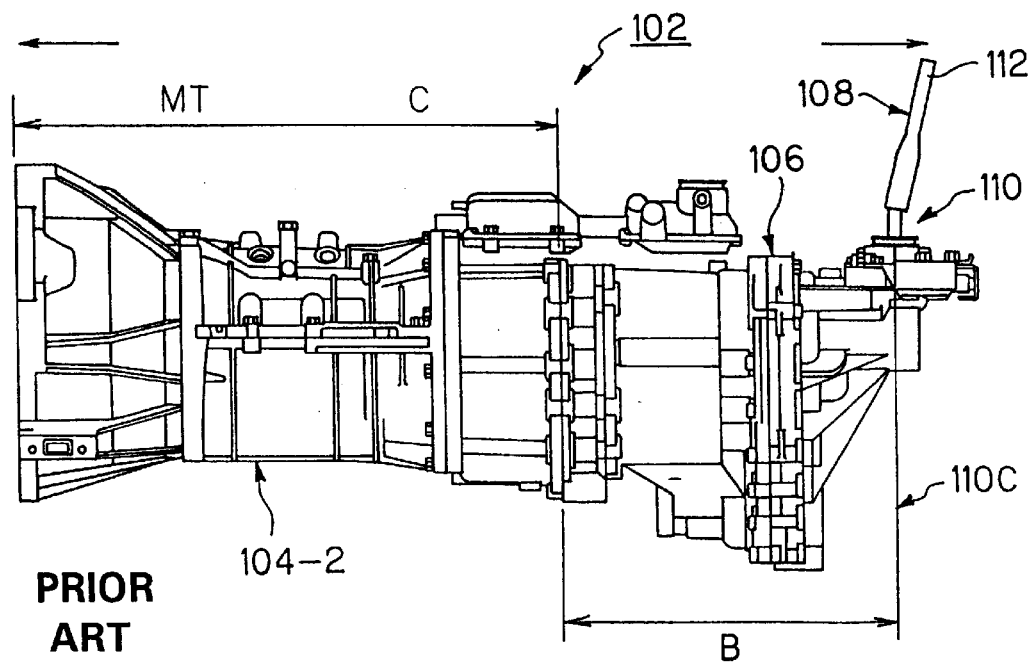
FIG. 8 is a side view of a transfer attached to a manual transmission as in the prior art.

Referring to FIGS. 3 and 6, the same transfer 6 can also be attached to a manual transmission (MT) 4-2. Since manual transmission 4-2 does not include parts such as torque converter or the like, and it has a length C which is slightly less than length A of automatic transmission 4-1. The difference between the lengths C and A is D=2S.

Referring to FIG. 6, when transfer 6 is attached to manual transmission 4-2, transfer lever 8 is rotated 180 degrees to position lever attachment piece 10 so that knob attachment piece 18 is slightly to the rear of center 10C. In other words, it is attached in an orientation rotated 180 degrees compared with the arrangement on automatic transmission 4-1.

Figure 9:
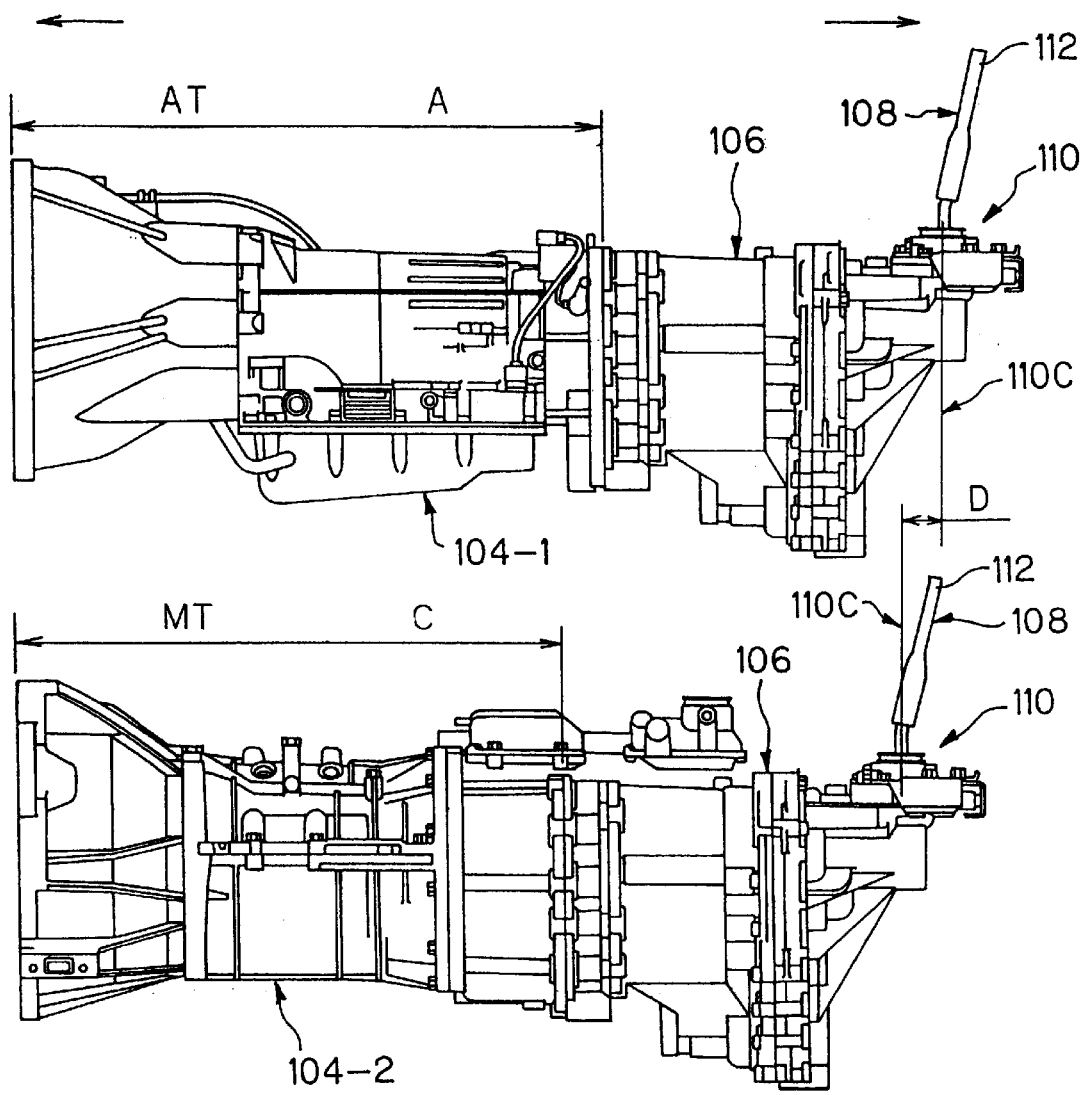
FIG. 9 is a drawing illustrating the relative positions of the knob attachment piece of a transfer lever attached to an automatic transmission and a manual transmission as in the prior art.

When transfer 6, with a uniform length B, is attached to each of automatic transmission 4-1, with a greater length A, and manual transmission 4-2, with lesser length B, knob attachment piece 18 is positioned at the same position on the center line CL which bisects the measure difference D of FIG. 9 of the prior art.

Figure 1:
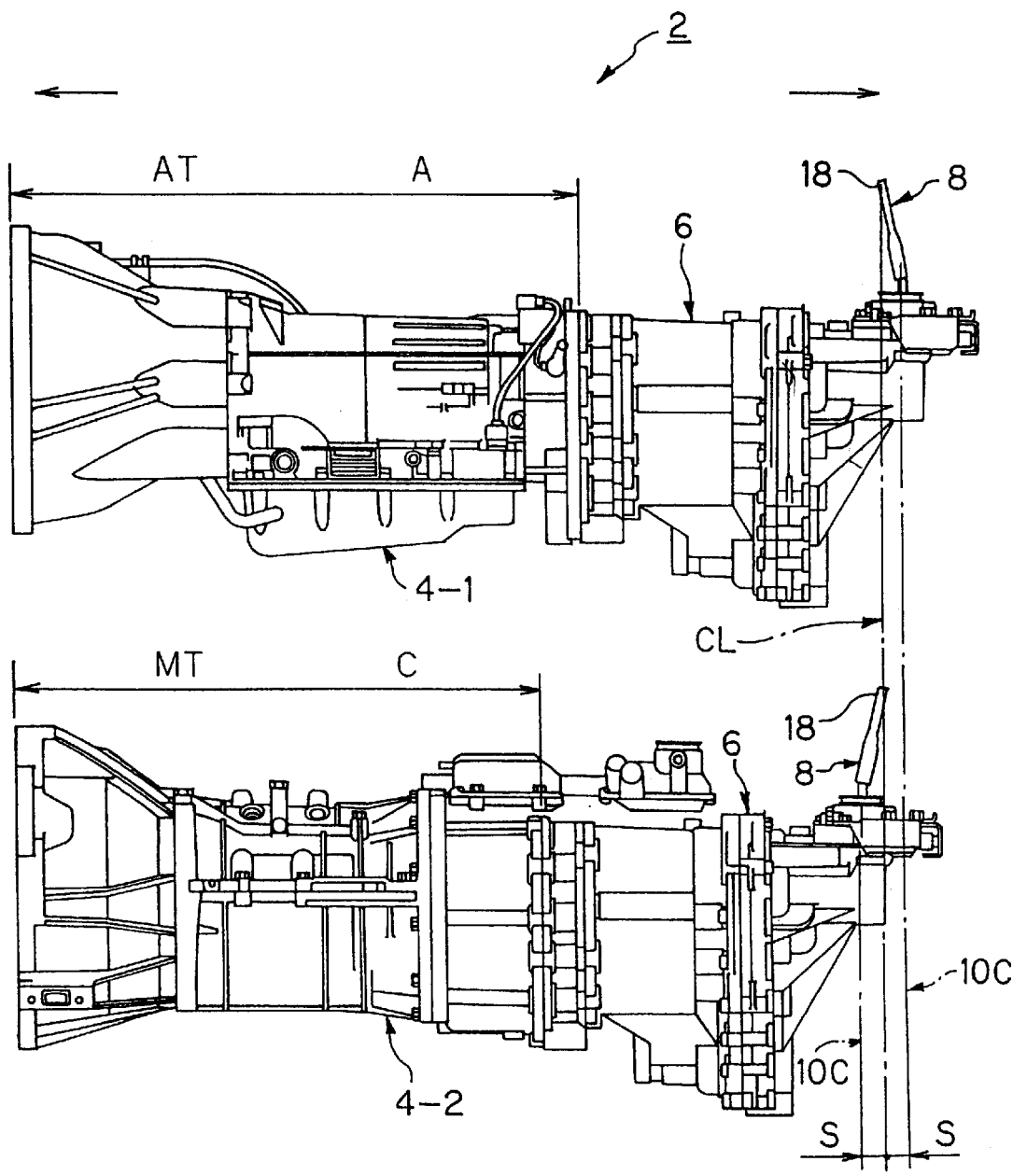
FIG. 1 is a drawing illustrating the relative lengths of an automatic transmission and a manual transmission.

Referring to FIG. 1, when the attachment orientation of transfer lever 8 is changed according to the differing lengths of the transmission, the path of knob attachment 18 changes. In the switching of transfer 6 between 4 wheel drive and 2 wheel drive, transfer 6 is set at the optimal position between the 2 wheel high speed (2H) and 4 wheel high speed (4H) which are believed to be used with great frequency.

Next, the operations of the described embodiment will be explained.

Referring to FIG. 1, when transfer 6, of fixed length B, is attached to automatic transmission 4-1, with a greater length A, and to manual transmission 4-2, with a lesser length C, the position of the transfer lever base moves slightly forward or backward. But by changing the attachment orientation of transfer lever 8, that is, the direction in which the angle theta is directed, the position of knob attachment 18 remains unchanged along the central line CL.

As a result, with 2 types of transmissions with differing lengths and, hence, differing positions where transfer lever 8 is attached, by rotating the attachment orientation of transfer lever 8 by 180 degrees, the position of knob attachment piece 18 of transfer lever 8 remains unchanged. Furthermore, with differing types of vehicles, an optimal shift position is obtained with the same transfer lever 8 and without changing the position of knob attachment piece 18.

According to the present invention, the transfer lever is bent at a point proximate its base. Transmissions of two different lengths are accommodated, by rotating the attachment orientation of transfer lever to place the knob attachment piece of the transfer lever in the same position for both transmissions. As a result, even though the position of the base of the transfer lever changes, the position of knob attachment piece of the transfer lever is maintained, and an optimal shift position is retained.

Furthermore, in addition to variations in transmission length, the present invention can accommodate differing types of vehicles. Using a single transfer lever, an optimal shift position can be attained without changing the fore and aft position of the knob attachment piece.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A transfer assembly, comprising:

a transfer apparatus a transfer lever operably connecting to said transfer apparatus;

said transfer lever operable to switch said transfer apparatus between a first and a second mode of operation;

said transfer lever having a base at a first end for attachment to said transfer apparatus and a knob attachment element at a second end for operation by an external operator;

a bend in said transfer lever proximate said base;

said bend placing said knob attachment element a distance S from a centerline of said transfer lever;

said transfer lever attachable to said transfer apparatus in a first and a second orientation;

said first and second orientation being 180 rotational degrees apart;

said first orientation positioning said knob attachment element said distance S forward of said centerline when said first mode of operation is used; and said second orientation positioning said knob attachment element said distance S rearward of said centerline when said second mode of operation is used, whereby said knob attachment element is disposed in a substantially similar location, relative to said operator.

2. A transmission assembly comprising:

a transmission including a switching element;

said switching element replaceably switching said transmission between a first and second mode of operation;

said first mode having a first length and said second mode having a second length, the difference between said first and second lengths being a distance D;

a transfer apparatus operably attached to said transmission;

a transfer lever operably attached to said transfer apparatus, operable to switch said transmission between said first and a second mode of operation;

said transfer lever having a base at a first end for operable attachment to said transfer apparatus and a knob attachment element at a second end for operation by an external operator;

a bend in said transfer lever proximate said base;

said bend placing said knob attachment element a distance D/2 from a centerline of said transfer lever;

said transfer lever attachable in a first and a second orientation;

said first and second orientation being 180 rotational degrees apart;

said first orientation positioning said knob attachment element said distance D/2 forward of said centerline when said transmission of said first mode is used; and said second orientation positioning said knob attachment element said distance D/2 rearward of said centerline when said transmission of said second mode is used, whereby said knob attachment element is disposed in a substantially similar location relative to said external operator, regardless of which mode is employed.

* * * * *